US009846980B2

(12) United States Patent
Park et al.

(10) Patent No.: US 9,846,980 B2
(45) Date of Patent: Dec. 19, 2017

(54) LOCK RELEASING METHOD OF ELECTRONIC DEVICE, AND APPARATUS THEREOF

(71) Applicant: Samsung Electronics Co., Ltd, Gyeonggi-do (KR)

(72) Inventors: Se-Wook Park, Seoul (KR); Yong-Joon Jeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 438 days.

(21) Appl. No.: 14/020,765

(22) Filed: Sep. 6, 2013

(65) Prior Publication Data

US 2014/0062653 A1    Mar. 6, 2014

(30) Foreign Application Priority Data

Sep. 6, 2012  (KR) .................. 10-2012-0098785

(51) Int. Cl.
 *G07C 9/00* (2006.01)
 *G06F 21/31* (2013.01)
 (Continued)

(52) U.S. Cl.
CPC ......... *G07C 9/00142* (2013.01); *G06F 21/31* (2013.01); *H04W 12/06* (2013.01); *H04W 88/02* (2013.01)

(58) Field of Classification Search
CPC . G07C 9/00142; G06F 21/31; G06F 3/04883; G06F 21/6218; H04W 12/06; H04W 88/02; H04L 63/08
See application file for complete search history.

(56) References Cited

U.S. PATENT DOCUMENTS 6,408,301 B1 *  6/2002  Patton ............... G06F 17/30265
                                              707/741
6,509,847 B1    1/2003  Anderson
              (Continued)

FOREIGN PATENT DOCUMENTS

CN      1832549 A       9/2006
KR   10-2010-0045252    5/2010
KR   10-2011-0066203    6/2011

OTHER PUBLICATIONS

Extended European Search Report dated Jul. 21, 2014 in connection with European Patent Application No. 13183344.4, 5 pages.
(Continued)

*Primary Examiner* — An T Nguyen

(57) ABSTRACT

The present disclosure relates to a lock releasing method of an electronic device, an apparatus thereof, and a medium storing a program source for the method. The lock releasing method includes: in response to a request for lock releasing, outputting reference data to be used for deciphering of a password; receiving a password input by a user; and, determining a correlation between the reference data and the password input by the user, and releasing the lock when the password input by the user has a correlation with the reference data. According to the present disclosure, it is possible to flexibly change a password for releasing a lock of various electronic devices, so as prevent the leakage of a password, and thus protect private information of a user and improve system security.

16 Claims, 11 Drawing Sheets

(51) Int. Cl.
    *H04W 12/06*    (2009.01)
    *H04W 88/02*    (2009.01)

(56) References Cited

U.S. PATENT DOCUMENTS

| | | | | |
|---|---|---|---|---|
| 7,219,368 B2* | 5/2007 | Juels | ............... | G06F 21/36 |
| | | | | 726/17 |
| 8,117,458 B2* | 2/2012 | Osborn, III | ............ | G06F 21/36 |
| | | | | 713/183 |
| 8,196,198 B1* | 6/2012 | Eger | ............... | G06F 21/36 |
| | | | | 726/2 |
| 8,832,810 B2* | 9/2014 | Cheswick | ............ | G01S 19/14 |
| | | | | 713/182 |
| 2003/0204733 A1* | 10/2003 | Krulce | ............... | G06F 21/31 |
| | | | | 713/183 |
| 2004/0034801 A1* | 2/2004 | Jaeger | ............... | G06F 21/36 |
| | | | | 726/6 |
| 2008/0184362 A1* | 7/2008 | Kumhyr | ............... | G06F 21/46 |
| | | | | 726/18 |
| 2008/0320310 A1* | 12/2008 | Florencio | ............... | G06F 21/31 |
| | | | | 713/184 |
| 2009/0199295 A1* | 8/2009 | Shih | ............... | G06F 21/36 |
| | | | | 726/18 |
| 2009/0241072 A1 | 9/2009 | Chaudhri et al. | | |
| 2010/0079380 A1 | 4/2010 | Nurmi | | |
| 2010/0146384 A1* | 6/2010 | Peev | ............... | H04M 1/673 |
| | | | | 715/255 |
| 2010/0325721 A1* | 12/2010 | Bandyopadhyay | ... | G06F 21/316 |
| | | | | 726/19 |
| 2011/0246951 A1* | 10/2011 | Chen | ............... | H04M 1/673 |
| | | | | 715/863 |
| 2011/0283353 A1* | 11/2011 | Maetz | ............... | G06F 21/36 |
| | | | | 726/18 |
| 2012/0216260 A1* | 8/2012 | Crawford | ............... | G06F 21/31 |
| | | | | 726/5 |
| 2013/0036461 A1* | 2/2013 | Lowry | ............... | G06F 21/36 |
| | | | | 726/19 |
| 2013/0069962 A1* | 3/2013 | Nealer | ............... | H04M 1/72563 |
| | | | | 345/522 |
| 2014/0062653 A1* | 3/2014 | Park | ............... | H04W 12/06 |
| | | | | 340/5.54 |
| 2014/0096178 A1* | 4/2014 | Shippy | ............... | G06F 21/316 |
| | | | | 726/1 |
| 2014/0331188 A1* | 11/2014 | Sandstrom | ............ | G06F 3/04883 |
| | | | | 715/863 |

OTHER PUBLICATIONS

Office Action dated Jul. 3, 2017 in connection with Chinese Patent Application No. 201310403545.2.

* cited by examiner

| INPUT TEXT | 1234 |
|---|---|
| CONVERSION INTO PRESET LANGUAGE | 1 → One<br>2 → Two<br>3 → Three<br>4 → Four |
| DETERMINED PASSWORD | OTTF |

FIG.7A

| INPUT TEXT | 1234 |
|---|---|
| CONVERSION INTO MORSE CODES | 1 → · — — — —<br>2 → · · — — —<br>3 → · · · — —<br>4 → · · · · — |
| DETERMINED PASSWORD | · — — — — · · — — — · · · — — · · · · — |

FIG.7B

LOCK RELEASING METHOD OF ELECTRONIC DEVICE, AND APPARATUS THEREOF

CROSS-REFERENCE TO RELATED APPLICATION(S) AND CLAIM OF PRIORITY

The present application is related to and claims the priority under 35 U.S.C. §119(a) to Korean Application Serial No. 10-2012-0098785, which was filed in the Korean Intellectual Property Office on Sep. 6, 2012, the entire content: of which is hereby incorporated by reference.

TECHNICAL FIELD

The present disclosure relates generally to a lock releasing method, an apparatus thereof, and a medium storing a program source for the method, and more particularly, to a lock releasing method of an electronic device, an apparatus thereof, and a medium storing a program source for the method.

BACKGROUND

In recent days, a wide variety of electronic devices including smart phones have been spread due to the advancement of information communication technology. A variety of applications including photo-taking and text-messaging are embedded in the smart phones.

Generally, the screen lock or lock screen function is employed in smart phones. The screen lock refers to a state wherein a smart phone displays only certain information while disabling most of the other smart phone functions, at the time of initial booting of the smart phone, after a certain time elapses without use of the smart phone, or upon user request.

The screen lock function restricts phone calls and prevents the leakage of private information, such as the contents of photo-transmission or text messaging.

Methods for releasing a screen lock use numbers or preset touch patterns as a password. Screen lock releasing methods run the risk of password leakage to those who are near to the phone user, due to the repeated input of the same numbers or touch patterns and thus, are greatly vulnerable to the leakage of private information of the user.

SUMMARY

To address the above-discussed deficiencies, embodiments of the present disclosure include a method of preventing the leakage of a password, which is used for releasing a lock.

The other advantages provided by the present disclosure can be understood from the embodiments described hereinafter.

Certain embodiments of the present disclosure include a method of releasing a lock of an electronic device. The method includes: in response to receiving a request for lock releasing, outputting reference data to be used for deciphering a password; receiving a password input by a user; determining a correlation between the reference data and the password input by the user, and releasing the lock when the password input by the user has a correlation with the reference data.

Certain embodiments of the present disclosure include a method of releasing a lock of an electronic device. The method includes: receiving an input text for determining a password from a user; determining one or more passwords based on the input text and a preset password determining method; in a locked state, receiving an input password for releasing the lock from the user; and in response to determining the input password correlates with one password among the determined one or more passwords, releasing the lock.

Certain embodiments of the present disclosure include an apparatus of releasing a lock of an electronic device. The apparatus includes: an input unit; an output unit; and a controller configured to: in response to receiving a request for lock releasing, outputting reference data to be used for deciphering of a password, determining a correlation between a password input by a user and the reference data, and releasing the lock when the password input by the user has a correlation with the reference data.

Certain embodiments of the present disclosure include an apparatus of releasing a lock of an electronic device. The apparatus includes: an input unit; and a controller configured to: receive an input from a user through the input unit, the input text for determining a password, determine one or more passwords based on the input text and a preset password determining method, in a locked state, in response to receiving from the user an input password for releasing the lock, determine whether the input password correlates with one password among the determined one or more passwords, and in response to determining the input password correlates with the one password, releasing the lock.

Certain embodiments of the present disclosure include a recording medium readable by a processor. In the recording medium, recorded is a program for executing a process including: in response to receiving a request for lock releasing, outputting reference data to be used for deciphering of a password; receiving a password input by a user; determining a correlation between the reference data and the password input by the user, and releasing the lock when the password input by the user has a correlation with the reference data.

Certain embodiments of the present disclosure include a recording medium readable by a process or. In the recording medium, recorded is a program for executing a process including: receiving an input text for determining a password from a user; determining one or more passwords based on the input text and a preset password determining method; in a locked state, receiving an input password for releasing the lock from the user; and in response to determining the input password correlates with one password among the determined one or more passwords, releasing the lock.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate examples of conversion for a method of releasing a lock in accordance with embodiments of the present disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, in the following description of various embodiments of the present disclosure, a detailed description of known functions and configurations incorporated herein will be omitted when it may make the subject matter of the present invention rather unclear.

As stated hereinabove, certain lock releasing methods, employing the repeated input of the same password, may allow an easy leakage of a password, which results in an easy leakage of private information of a user.

Accordingly, an embodiment of the present disclosure provides a method of preventing the leakage of a password for releasing a lock by flexibly changing the password.

Hereinafter, a smart phone will be taken as an example for the sake of convenience to provide an explanation, however, the present disclosure is not solely limited to a smart phone and can be applied to a wide array of electronic devices such as computers, electronic gates, etc.

Hereinafter, although the lock releasing of a smart phone will be used as an example to provide an explanation, the present disclosure is not solely limited to a smart phone and can be applied to the lock releasing of various applications, computers, electronic gates and so on.

Hereinafter, various embodiments of the present disclosure will be described with reference to the accompanying drawings.

First, an embodiment of a method for releasing a lock using metadata will be described with reference to FIGS. 1 to 3D.

Figure 1:
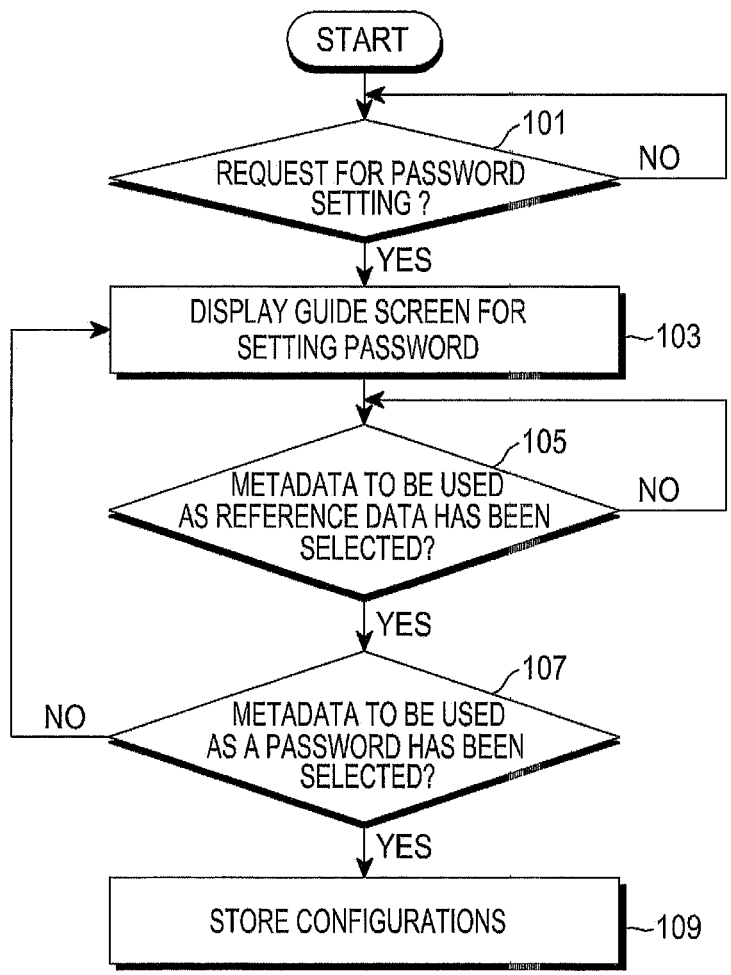
FIG. 1 illustrates a process of a password setting method using metadata according to embodiments of the present disclosure.

FIG. 1 illustrates a password setting method using metadata according to embodiments of the present disclosure.

In block 101, when there is a request for a password-setting from a user, a terminal, such as a mobile terminal or smart phone, proceeds to block 103.

In block 103, the terminal displays a guide screen for setting a password, and then proceeds to block 105. The user can perform operations for setting a password in the following block according to the guide provided by the terminal.

In block 105, the terminal determines whether metadata to be used as reference data has been selected. When metadata to be used as reference data has been selected, the terminal proceeds to block 107.

Reference data includes data to be output, in response to a request for lock releasing from a user, on a screen or via a speaker and to be used by the user to infer a password for releasing a lock. That is, the user can infer a password for releasing a lock by viewing or listening to the reference data. Examples of reference data include text, image, audio or video data.

The metadata to be used as reference data can be selected differently depending on individual files. For example, a cover image can be selected as reference data for a first music file, while a song title is selected as reference data for a second music file. Also for example, it is possible to select reference data which is commonly applied to all files belonging to a particular type. For example, a cover image can be selected as reference data for all music files.

In block 107, the terminal determines whether metadata to be used as a password has been selected. When metadata to be used as a password has been selected, the terminal proceeds to block 109.

Similarly to the metadata to be used as reference data, the metadata to be used as a password can be selected differently depending on individual files or alternatively, be selected so as to be commonly applicable to all files belonging to a particular type. In certain embodiments of the present disclosure, except for the metadata selected to be used as reference data, the rest of the metadata can be made available to be used as a password. Hereinafter, an explanation will be provided on the presumption that all metadata, except for the metadata selected as reference data, are configured to be used as a password.

In block 109, the terminal stores the configurations made in block 105 and 107.

As described above, a method of setting a password using metadata in accordance with embodiments of the present disclosure has been described with reference to FIG. 1. Hereinafter, a method of releasing a lock using metadata in accordance with embodiments of the present disclosure will be described with reference to pertinent drawings.

Figure 2:
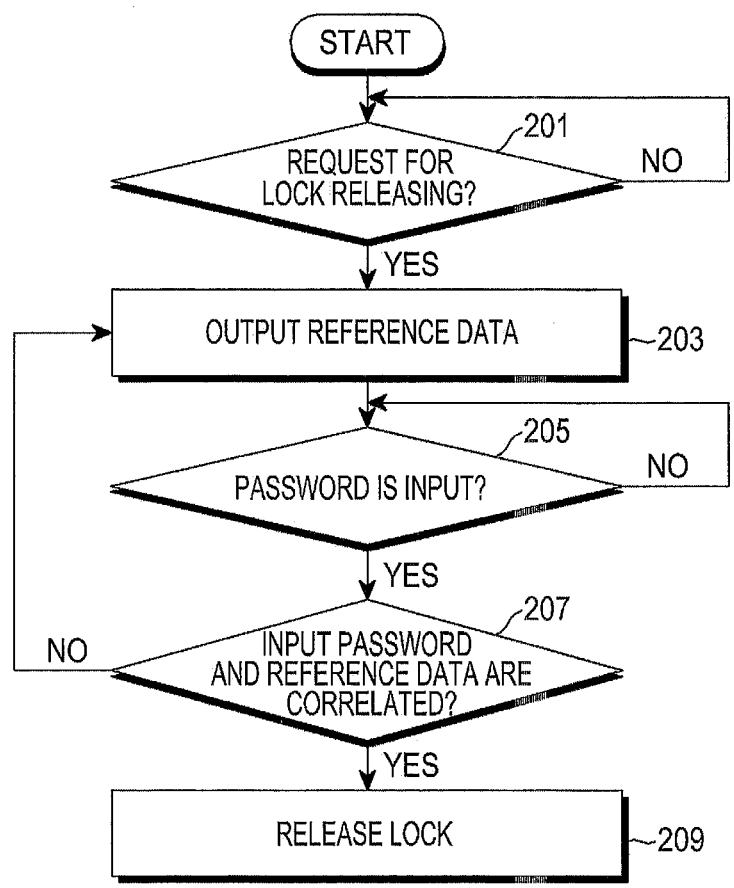
FIG. 2 illustrates a process of a lock releasing method using metadata according to embodiments of the present disclosure.

FIG. 2 illustrates a method of releasing a lock using metadata in accordance with embodiments of the present disclosure.

In block 201, a terminal determines whether lock releasing is requested by a user. When the terminal detects that lock releasing, is requested by a user, the terminal proceeds to block 203.

In block 203, the terminal outputs reference data, and then proceeds to block 205. Reference data can be output on a screen or through a speaker. Simultaneously, while outputting the reference data, the terminal displays an input field through which the user may enter a password. In accordance with embodiments of the present disclosure, after outputting reference data, the terminal outputs an input field as the user touches a screen or enters particular keys. Further, in accordance with embodiments of the present disclosure, a password can be input using a voice (for example, a voice of the user) and accordingly, the terminal offers a guide for voice input.

In block 205, the terminal determines whether a password is entered by the user. When the terminal detects that a password has been entered, the terminal proceeds to block 207.

In block 207, the terminal determines the correlation between the user-input password and the output reference data. If the terminal finds the existence of a correlation between the user-input password and the output reference data, the terminal proceeds to block 209. Otherwise, the terminal proceeds to block 203. The correlation between the user-input password and the output reference data can be found, for example, by determining whether the input password and the reference data are metadata belong to the same file. That is, if the input password and the output reference data are metadata belonging to the same file, is the terminal determines that the password and the reference data are mutually correlated.

In block 209, to which the terminal proceeded from block 207 wherein the terminal determined that the user-input password and the output reference data are mutually correlated, the terminal releases a lock.

By contrast, as a result of the determination in block 207, if there is no correlation between the user-input password and the output reference data, the terminal returns to block 203 and continues to output reference data. In this event, the terminal can output reference data different from the previously output reference data, in accordance with embodiments of the present disclosure. For example, if the terminal, after outputting reference data for a first music file, determines that the user-input password is not correlated to the first music file, the terminal can output reference data for a second music file at the time of outputting reference data again. Further, in accordance with embodiments of the present disclosure, the terminal can output reference data different from the previous reference data, only when the lock is released successfully using the previously input password.

As described above, a method of releasing a lock using metadata in accordance with embodiments of the present disclosure has been described with reference to FIG. 2. Hereinafter, embodiments of releasing a lock using metadata will be described with reference to pertinent drawings.

FIGS. 3A to 3D illustrate an example of releasing a lock using metadata in accordance with embodiments of the present disclosure.

The metadata to be used for releasing a lock in embodiments of the present disclosure can be metadata of various types such as music, image, and video files. Herein, for the sake of convenience, a method for releasing a lock using a music file will be described as an example.

Figure 3A:
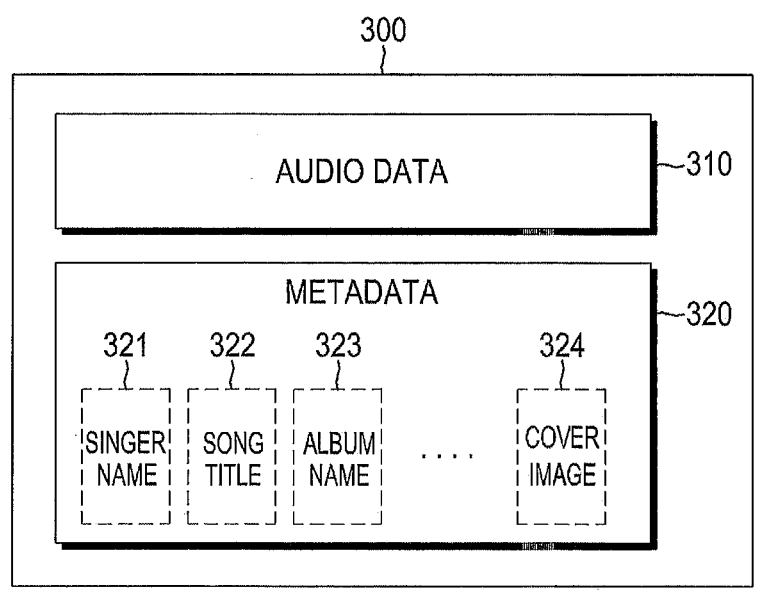
FIGS. 3A to 3D illustrate example views of releasing a lock using metadata in accordance with embodiments of the present disclosure.

First, the structure of a music file will be discussed with reference to FIG. 3A. As noted from FIG. 3A, the music file 300 includes audio data 310 and metadata 320 of the audio data 310. The metadata 320 may include a singer name 321, a song title 322, an album name 323, and a cover image 324, in relation to the audio data 310.

Here, as described above, at least one piece of metadata among the metadata 320 is selected as reference data. For example, a cover image 324 of the music file 300 may be selected as reference data.

Further, at least one piece of metadata among the metadata 320 can selected to be used as a password. For example, when a cover image 324 is selected as reference data, a singer name 321, a song title 322, or an album name 323 may be selected to be used as a password. In accordance with embodiments of the present disclosure, upon selection of reference data, all metadata, except for the selected metadata, is made available to be used as a password.

After selection of the metadata to be used as reference data and a password, if there is a request for lock releasing from the user, the terminal selects one piece of reference data from preset reference data and outputs the selected reference data. The selection of the reference data to be output can be made either randomly or sequentially, depending on the configurations. Further, the outputting of reference data can be implemented through a speaker or on a screen.

Figure 3B:
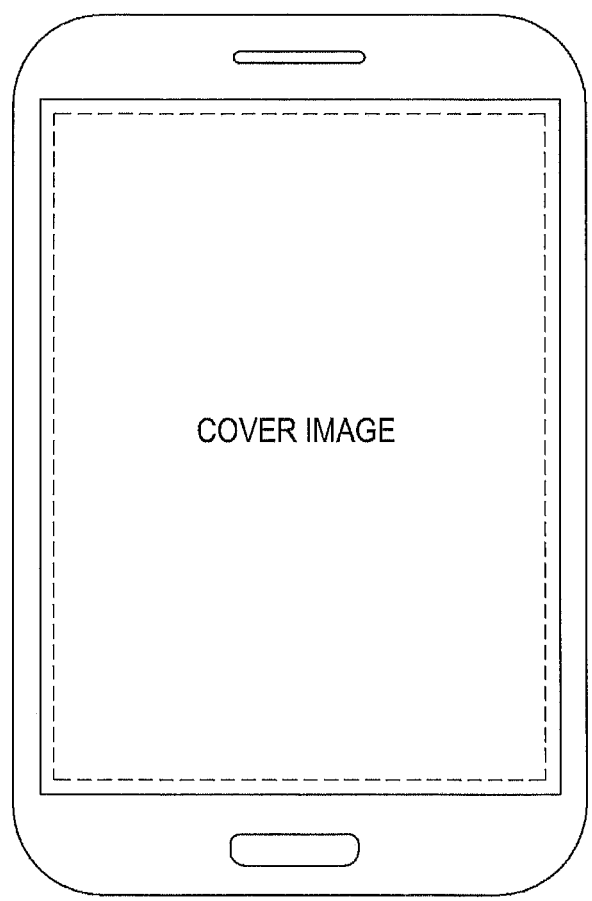
Figure 3C:
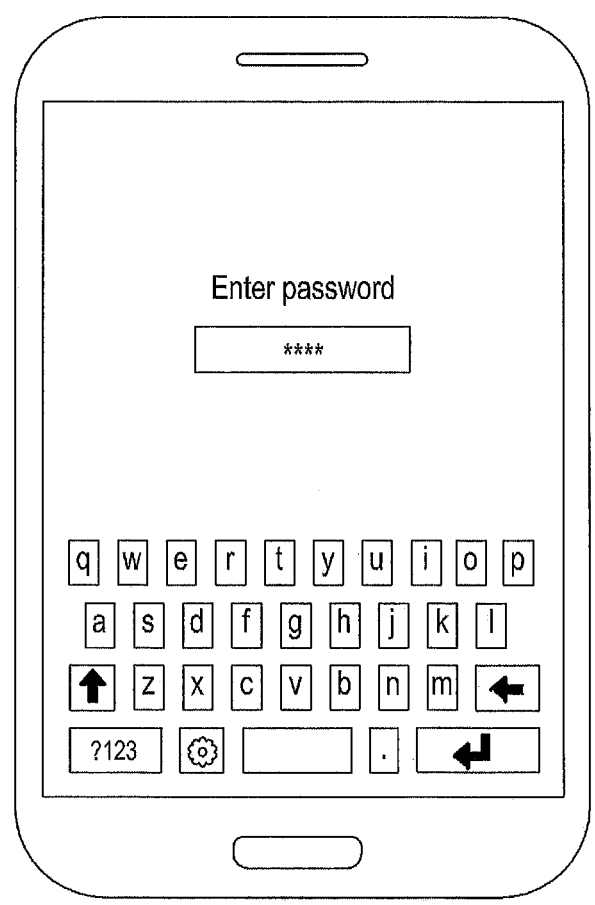
Figure 3D:
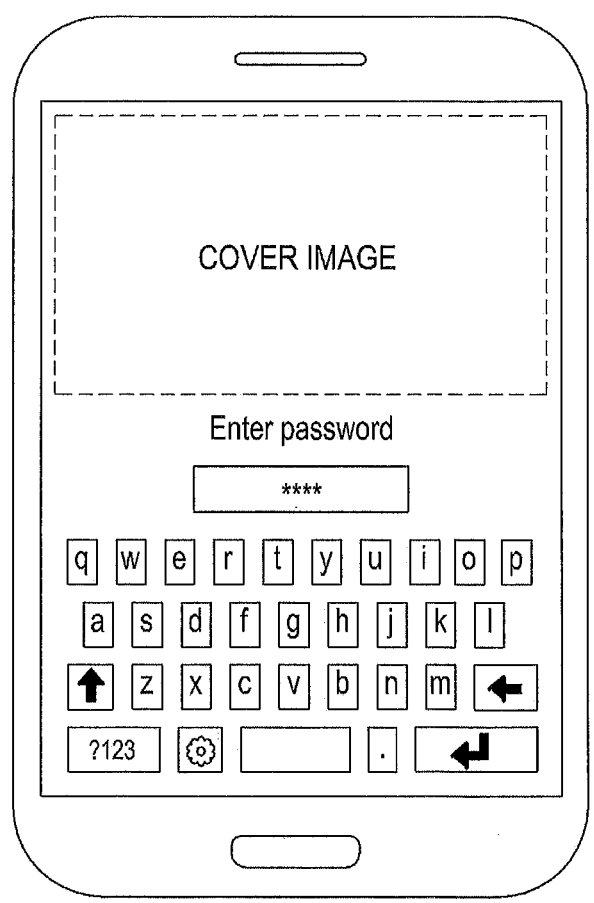

FIG. 3B illustrates a screen displaying a cover image as reference data. After the reference data is displayed, if there is a touch of a display area or a user input through particular buttons, the terminal displays a screen where a password can be input as illustrated in FIG. 3C. In accordance with embodiments of the present disclosure, as illustrated in FIG. 3D, the terminal displays reference data in one part of the display area while displaying a screen for input of a password in the remaining part of the display area.

Thereafter, the terminal determines whether the password input by the user is related to the output reference data. For example, if a cover image of a particular music file is displayed as reference data, the terminal determines whether the password input by the user coincides with one piece of metadata among the metadata of the particular music file. Further, if the password input by the user correlates with one piece of metadata among the metadata of the particular music file, the terminal determines the correlation between the two as existing, and thus releases the lock.

The description made above is limited to the case where only metadata is selected as reference data. However, in addition thereto, audio data of a music file, image data of an image file, or video data of a video file can be selected as reference data.

As described above, a method of releasing a lock using metadata in accordance with an embodiment of the present disclosure has been discussed with reference to FIGS. 1 to 3D. Further, similar to the embodiments described above with reference to FIGS. 1 to 3D, a lock can also be released using an address book. That is, particular information included in an address book can be used as reference data while the remaining information of the address book is used as a password. Hereinafter, an embodiment of releasing a lock using an address book will be described with reference to FIG. 4.

Figure 4:
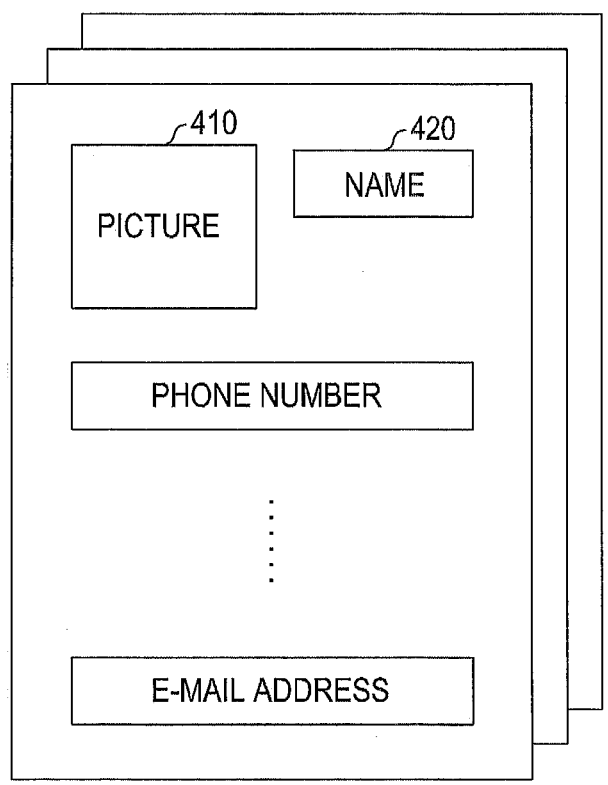
FIG. 4 illustrates a block diagram for describing a method of releasing a lock using an address book in accordance with embodiments of the present disclosure.

FIG. 4 illustrates a block diagram for describing a method of releasing a lock using an address book in accordance with embodiments of the present disclosure.

As illustrated in FIG. 4, an address book includes contact information (including phone numbers, e-mail addresses, etc.) with respect to multiple persons, and private information (including names, pictures, etc.) corresponding to the contact information. For the purpose of releasing a lock using an address book, it is possible to make all private information corresponding to all contact information incorporated in the address book be able to be selected for releasing a lock or, make private information of only particular contact information be able to be selected for releasing a lock. Further, among the private information, a piece of private information to be used as reference data and a piece of private information to be used as a password can be individually selected, respectively.

In accordance with embodiments of the present disclosure, once a piece of private information to be used as reference data has been selected, the remaining pieces of private information can be used as a password. For instance, if a picture 410, among private information corresponding to the particular contact information, has been selected as reference data, the name 420 can be configured to be used as a password.

After a piece of private information to be used as reference data and a piece of private information to be used as a password have been set, respectively, if there is a request for lock releasing from the user, the terminal outputs the reference data. Further, the terminal determines whether a password input by the user corresponds with at least one piece of private information among the private information corresponding to the contact information to which the reference data belongs, except for the element corresponding to the reference data. Further, if the password input by the user corresponds with at least one piece of private information among the private information corresponding to the contact information, the terminal approves the correlation between them, and as a result, releases the lock.

As described above, a method of releasing a lock using an address book in accordance with embodiments of the present disclosure has been described with reference to FIG. 4. Meanwhile, similarly to the embodiments described above with reference to FIGS. 1 to 4, a lock can also be released using time information. That is, current time information can be used as reference data while a combination of numbers constituting the current time information is used as a password. Hereinafter, embodiments of releasing a lock using time information will be described with reference to FIG. 5.

Figure 5:
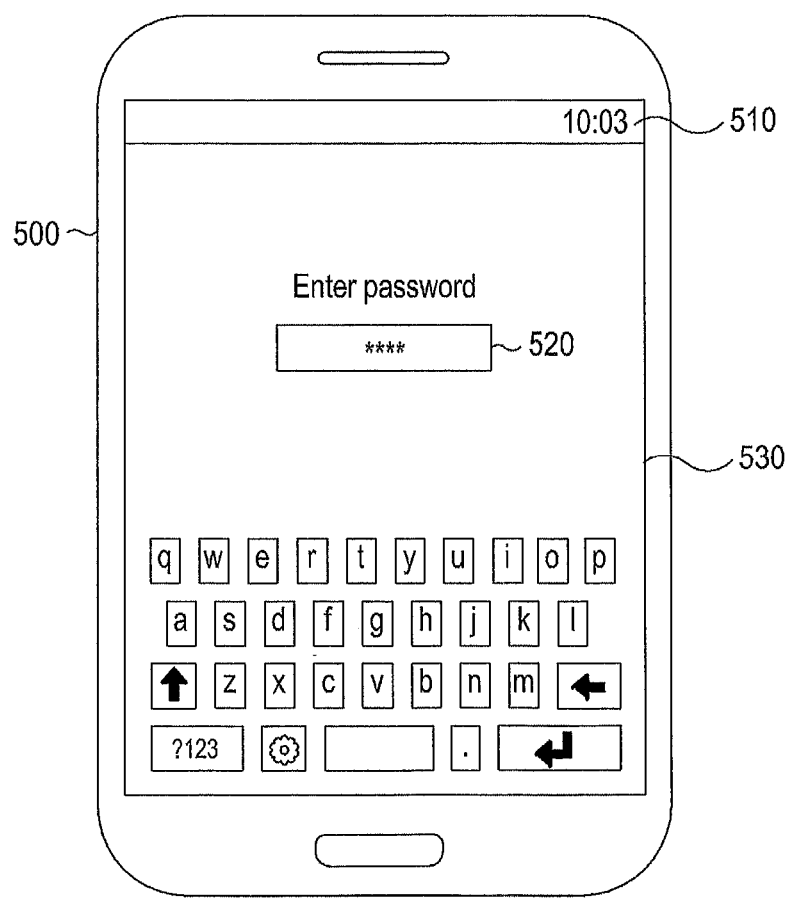
FIG. 5 illustrates a terminal for implementing a method of releasing a lock using time information according to embodiments of the present disclosure.

FIG. 5 illustrates describing terminal 500 for implementing a method of releasing a lock using time information according to embodiments of the present disclosure.

Time data, for example, current time information 510, can be selected as reference data. At the time of selection, the terminal 500, upon request for lock releasing, displays an input field 520, through which the current time and a password can be input, on a screen 530.

In this event, a user may input a password by referring to the current time 510. For example, as illustrated in FIG. 5, if the current time is 10:03, the password can be a number array obtained by creating an array using a preset number of digits among the digits constituting the current time. That is, "1003" can be a password.

Accordingly, if "1003" is input by a user, the terminal 500 determines that the current time of 10:03 and the input "1003" are mutually correlated, and as a result, releases the lock.

In accordance with embodiments of the present disclosure, current date information can be set as reference data.

As described above, a method of releasing a lock using reference data has been described with reference to FIGS. 1 to 5. Hereinafter, an embodiment of converting a user-input text into a certain format and using the converted user-input text as a password will be described with reference to pertinent drawings.

Figure 6:
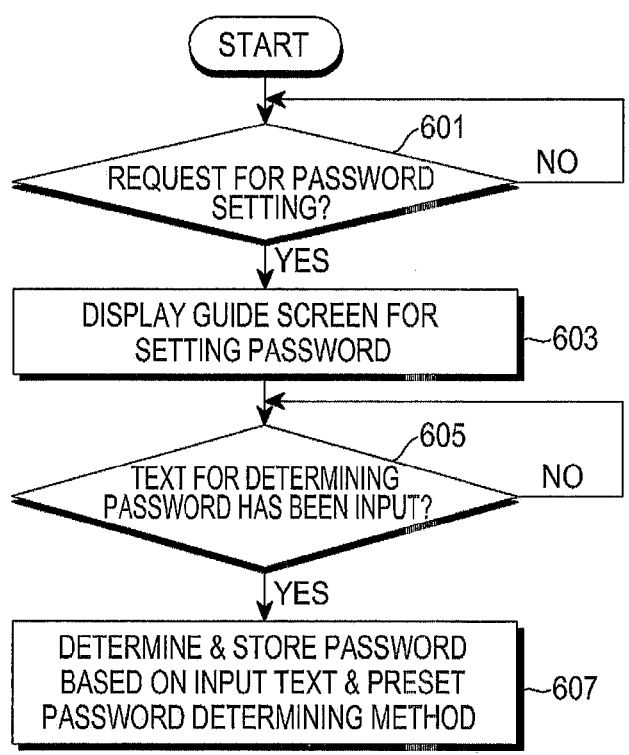
FIG. 6 illustrates a process of releasing a lock in accordance with embodiments of the present disclosure.

FIG. 6 illustrates a process of releasing a lock in accordance with embodiments of the present disclosure.

In block 601, when there is a request for lock releasing from a user, the terminal proceeds to block 603 in which the terminal displays a guide screen for setting a password.

In block 605, the terminal determines whether a user has input a text to be used for determining a password. When the terminal determines that the user has input a text to be used for determining a password, the terminal proceeds to block 607.

In block 607, the terminal determines a password based on the input text and a preset password determining method, and then stores the determined password. Thereafter, if the determined password is input, the terminal releases the lock. Two examples of the preset password determining method will be described hereinafter. In the first example, a user-input text is converted using a preset language, and an array of characters obtained by combining the initial letters of respective words of the converted text is then determined as a password. In the second example, a user-input text is converted into Morse code, which are then determined as a password.

Now, the first example will be described with reference to FIG. 7A. In this example, a text of "1234" has been input by a user for determination of a password, and a preset conversion method converts the input text into an English text, the terminal converts the input text into an English text, namely, "One Two Three Four." Thereafter, "OTTF", which is an array of characters obtained by combining the initial letters of respective words of the English text, is determined as a password.

Now, the second example will be described with reference to FIG. 7B. In this example, a text of "1234" has been input by a user for determination of a password and a preset conversion method converts the input text into Morse codes, the terminal converts the input text to corresponding Morse codes, i.e., "•----, ••---, •••--, ••••-." Thereafter, an array obtained by combining the Morse codes, that is, "•----••---•••--••••-", is determined as a password. In this example, the terminal can displays a keyboard through which Morse codes can be input. In accordance with embodiments of the present disclosure, particular keys provided at the terminal can be mapped to the Morse codes, '•', and '-', respectively.

As described above, a method of releasing a lock in accordance with embodiments of the present disclosure has been described with reference to FIGS. 1 to 7. Hereinafter, a lock releasing apparatus to which embodiments of the present disclosure are applied will be described.

Figure 8:
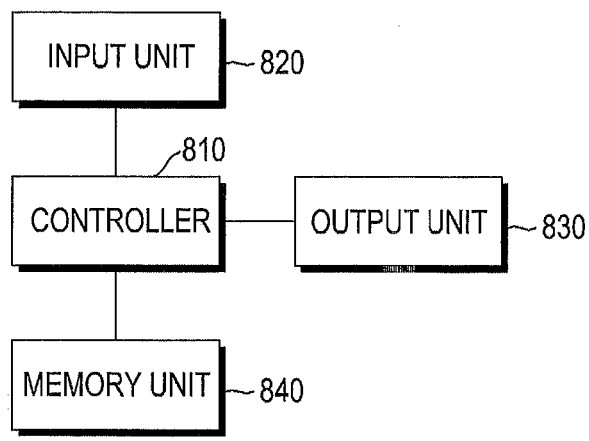
FIG. 8 illustrates a lock releasing apparatus to which embodiments of the present disclosure are applied.

FIG. 8 is a block diagram of a lock releasing apparatus to which embodiments of the present disclosure are applied.

Referring to FIG. 8, the lock releasing apparatus to which embodiments of the present invention are applied includes a controller 810, an input unit 820, an output unit 830 and a memory unit 840.

The controller 810, upon receiving a request for password setting through the input unit 820, displays a guide screen for password setting through the output unit 830. Further, the controller 810 receives a selection of data to be used as reference data by a user, through the input unit 820. In accordance with certain embodiments of the present disclosure, the controller 810 receives a selection of data to be used as a password by the user, through the input unit 820. When the password setting has been completed, the controller 810 stores the configurations in the memory unit 840.

In the meantime, the controller 810, upon receiving a request for lock releasing through the input unit 820, outputs the reference data to be used for deciphering a password through the output unit 830. Further, the controller 810 determines the correlation between the password input by the user through the input unit 820 and the output reference data. When the terminal determines that the input password has a correlation with the output reference data, the terminal releases the lock. The reference data described above can include a data type among text, image, audio, and video data.

Further, the reference data as described above can be metadata constituting a preset file. When the output reference data is metadata constituting the preset file and a password input by the user corresponds with at least one piece of metadata among all the metadata constituting the file to which the output reference data belongs, except for the output reference data, the controller 810 determines that there is a correlation between the password input by the user and the output reference data, and thus releases the lock.

Also, the reference data can include private information corresponding to a preset contact information among the contact information included in an address book. When the output reference data is private information corresponding to a preset contact information among the contact information included in an address book and the input password corresponds with at least one piece of private information among all pieces of private information corresponding to the contact information to which the output reference data belongs, except for the reference data, the controller 810 determines that there is a correlation between the password input by the user and the output reference data, and thus releases the lock.

In certain embodiments, the reference data can be time data indicating a current time. When the output reference data is the time data indicating the current time and the input password corresponds with a number array obtained by creating an array using a preset number of digits among the digits constituting the time data, the controller 810 determines that there is a correlation between the password input by the user and the output reference data, and thus release the lock.

Also, at the time of outputting the reference data, the controller 810 selects a piece of reference data to be output, from multiple pieces of preset reference data. In accordance with embodiments of the present disclosure, the controller 810 outputs reference data different from the reference data output in response to a previous request for lock releasing. Alternatively, in accordance with an embodiment of the present disclosure, the controller 810 outputs reference data different from the previous reference data, only when a lock has been successfully released through the previously input password.

In addition, the controller 810 receives, through the input unit 820, a user-input text to be used for determining a password. The controller 810 determines at least one password based on the input text and a predetermined password determining method. The controller 810 receives, through the input unit 820, a password input by the user to be used for releasing a lock. When the password input by the user correlates with at least one password determined based on the input text and the preset password determining method, the controller 810 can release the lock.

In order to determine the at least one password as described above, to the terminal employs a method of converting an input text for determining a password into a converted text in a predetermined language, and then determines an array of characters obtained by combining initial letters of respective words of the converted text, as a password.

In certain embodiments, in order to determine the at least one password as described above, to the terminal employs a method of converting a user-input text into Morse codes and then determining the Morse codes as a password.

The input unit 820 can be implemented as a keyboard or a microphone. Here, the keyboard can be either a virtual keyboard displayed on the screen, namely, a keyboard in software form, or a keyboard in hardware form.

The output unit 830 can be implemented either a display or a speaker.

The memory unit 840 stores a variety of files, such as music, image, and video files, as well as an address book. Further, the memory unit 840 stores information by which it is possible to distinguish between the data used as reference data and the data used as a password. The stored data can be referred to by the controller 810 to release a lock.

According to embodiments of the present disclosure, it is possible to flexibly change a password for releasing a lock of various electronic devices, so as prevent the leakage of a password, and thus protect private information of a user and improve system security.

The above-described embodiments of the present disclosure can be implemented through various optional methods. For example, the embodiments of the present disclosure can be implemented using hardware, software, or a combination thereof. In a case of implementation using software, the embodiments can be implemented using software executed on one or more processors using various operating systems or platforms. In addition, such software can be created by selecting one from a plurality of appropriate programming languages and be compiled using executable machine codes running on a framework or virtual machine or using intermediate codes.

Further, if the embodiments of the present disclosure are implemented on at least one processor, such embodiments can be implemented through a processor-readable medium (e.g. memory, floppy disc, hard disc, compact disc, optical disc, or magnetic tape etc.) which records at least one program to carry out the methods for implementing various embodiments of the present disclosure as discussed above.

Although the present disclosure has been described with an examples, various changes and modifications may be suggested to one skilled in the art. It is intended that the present disclosure encompass such changes and modifications as fall within the scope of the appended claims.

What is claimed is:

1. A method of releasing a lock of an electronic device, the method comprising:
   receiving metadata used as reference data and metadata used as a first password in association with a file, wherein the reference data is for deciphering of the first password;
   storing the metadata used as the reference data and the metadata used as the first password;
   in response to receiving a request for lock releasing, outputting the reference data;
   receiving a second password input by a user;
   determining a correlation between the second password input by the user and at least one of the reference data and the first password; and
   releasing the lock if the second password input by the user has a correlation with at least one of the reference data and the first password,
   wherein the metadata used as the reference data and the metadata used as the first password comprises preset files that belong to the file,
   wherein the file, to which the preset files belong, comprises: the reference data and additional metadata, wherein the file includes a plurality of metadata, the plurality of metadata including the metadata used as the reference data and the metadata used as the first password, wherein determining the correlation comprises determining whether the second password input by the user correlates with at least one piece of metadata among the plurality of metadata, wherein the at least one piece of metadata excludes the reference data.

2. The method of claim 1, wherein the reference data includes one of: text data, image data, audio data, and video data.

3. The method of claim 1, wherein the reference data is private information corresponding to a preset piece of contact information among all pieces of contact information constituting an address book.

4. The method of claim 3, wherein determining the correlation comprises:
   determining whether the second password input by the user coincides with at least one piece of private information among all pieces of private information corresponding to a piece of contact information to which the reference data belongs, wherein the at least one piece of private information excludes the reference data.

5. The method of claim 1, wherein the reference data is time data indicating a current time.

6. The method of claim 5, wherein determining the correlation comprises determining whether the second password input by the user correlates with a number array obtained by creating an array using a preset number of digits among digits constituting the time data.

7. The method of claim 1, wherein outputting the reference data comprises selectively outputting predetermined reference data among preset multiple pieces of reference data.

8. The method of claim 1, wherein outputting the reference data comprises outputting reference data different from reference data output in response to a previous request for lock releasing.

9. An apparatus for releasing a lock of an electronic device, the apparatus comprising:
   an input unit;
   an output unit;
   a memory; and
   a controller configured to:
      receive, by using the input unit, metadata used as reference data and metadata used as a first password in association with a file, wherein the reference data is for deciphering of the first password;
      store the metadata used as the reference data and the metadata used as the first password in the memory;
      in response to receiving a request for lock releasing, output the reference data,
      determine a correlation between a second password input by a user and at least one of the reference data and the first password, and
      release the lock if the second password input by the user has a correlation with at least one of the reference data and the first password,
   wherein the metadata used as the reference data and the metadata used as the first password comprise present files that belong to a file,
   wherein the file, to which the preset files belong, comprises the reference data and additional metadata,
   wherein the file includes a plurality of metadata, the plurality of metadata including the metadata used as the reference data and the metadata used as the first password,
   wherein the controller is further configured to:
      determine whether the second password input by the user correlates with at least one piece of metadata among the plurality of metadata, and
      release the lock if the second password input by the user correlates with the at least one piece of metadata,
   wherein the at least one piece of metadata excludes the reference data.

10. The apparatus of claim 9, wherein the reference data includes one of: text data, image data, audio data, and video data.

11. The apparatus of claim 9, wherein the reference data is private information corresponding to a preset piece of contact information among pieces of contact information within an address book.

12. The apparatus of claim 11, wherein the controller is further configured to:
   determine whether the second password input by the user correlates with at least one piece of private information among all pieces of private information corresponding to a piece of contact information to which the reference data belongs,
   in response to determining the second password input by the user correlates with the at least one piece of private information, releases the lock, and
   wherein the at least one piece of private information excludes the reference data.

13. The apparatus of claim 9, wherein the reference data is time data indicating a current time.

14. The apparatus of claim 13, wherein the controller is further configured to:
   determine whether the second password input by the user correlates with a number array obtained by creating an array of a preset number of digits among digits constituting the time data, and
   in response to determining the second password input by the user correlates with the number array, releases the lock.

15. The apparatus of claim 9, wherein the controller is further configured to:
   selectively output predetermined reference data among preset multiple pieces of reference data.

16. The apparatus of claim 9, wherein the controller is further configured to:
   output reference data different from reference data output in response to a previous request for lock releasing.

* * * * *